United States Patent
Chang

(10) Patent No.: US 7,684,186 B2
(45) Date of Patent: Mar. 23, 2010

(54) SECURITY MECHANISM OF A BASE

(75) Inventor: Hung-Chieh Chang, Taipei (TW)

(73) Assignee: Clientron Corp., Taipei (TW)

( * ) Notice: Subject to any disclaimer, the term of this patent is extended or adjusted under 35 U.S.C. 154(b) by 89 days.

(21) Appl. No.: 12/216,276

(22) Filed: Jul. 2, 2008

(65) Prior Publication Data

US 2009/0168327 A1    Jul. 2, 2009

(30) Foreign Application Priority Data

Dec. 28, 2007    (TW) .............................. 96222307 U

(51) Int. Cl.
     *G06F 1/16*        (2006.01)
(52) U.S. Cl. .................. 361/679.43; 345/163; 439/638; 455/572; 713/320
(58) Field of Classification Search ................ 345/163, 345/589; 439/676, 131, 59, 638; 726/17, 726/20; 361/679.17, 679.02, 679.4, 679.43, 361/679.46; 379/93.05; 165/80.04; 381/77, 381/123; 62/259.2, 3.2; 713/170, 300, 320; 455/41.3, 572, 556.2, 558
See application file for complete search history.

(56) References Cited

U.S. PATENT DOCUMENTS

| | | | |
|---|---|---|---|
| 2003/0186592 A1* | 10/2003 | Potega ........................ | 439/676 |
| 2007/0089170 A1* | 4/2007 | Chen et al. .................... | 726/20 |
| 2007/0132733 A1* | 6/2007 | Ram ........................... | 345/163 |
| 2008/0244731 A1* | 10/2008 | Chang ......................... | 726/17 |

* cited by examiner

*Primary Examiner*—Hung V Duong
(74) *Attorney, Agent, or Firm*—Bacon & Thomas, PLLC

(57) ABSTRACT

The present invention relates to a security mechanism of a base, which is substantially a base. One side surface of the base is provided with a plurality of connecting ports for peripheral devices. The base is provided thereon with a trough and a retaining strip. The trough is provided therein with a connecting port. The retaining strip is disposed above one side of the trough so as to form a guard, thereby increasing the safety of the base and the performance of the computer host.

7 Claims, 4 Drawing Sheets

SECURITY MECHANISM OF A BASE

FIELD OF THE INVENTION

The present invention relates to a security mechanism of a base, and in particular to a base on which a trough and a retaining strip are provided to form a guard, thereby improving the safety of the base. Therefore, the present invention is applicable to a barebone computer, a thin client, a mini computer or the like.

BACKGROUND OF THE INVENTION

With the continuous development of technology, computer has become a necessary tool for modern life. There is a tendency to design the computer host in a more compact manner. However, it is not easy to improve the computer performance and also conform to the compact demands of a computer. In order to miniaturize the volume of the computer host so as to be carried about easily, the manufacturer proposes various barebone computers, thin clients, mini computers or the like which emphasize on the performance thereof only but exclude the connecting ports for peripheral devices.

Although the barebone computer, the thin client or the mini computer can be carried about easily, there is still a lot of inconvenience in use. Specifically, when the barebone computer, the thin client or the mini computer is used at home, it should be connected with other peripheral devices, such as a scanner, printer, optical disk driver, monitor, keyboard, mouse or the like. Since the connecting ports for these common peripheral devices have been excluded, it is necessary to additionally connect with other connecting ports for the peripheral devices, which is really inconvenient.

Furthermore, although the barebone computer, the thin client or the mini computer is equipped with an expansion module or a connecting base, there is still a problem in practical use. For example, the connection between the expansion module or the connecting base and the computer host is achieved merely by the connection of two connecting ports, and such a connection may be detached or loosened accidentally. Since many sophisticated components are disposed in the computer host, the detachment of the connecting ports may cause a power failure, a high-voltage surge, noises, high-low voltage transient phase or other harmful influences. As a result, the components within the computer host or the base will suffer damage, so that the information may be lost or the components of the computer may suffer damage.

Therefore, in view of the above drawbacks of prior art, the inventor of the present invention has proposed a novel and inventive structure based on his expert experience and researches.

SUMMARY OF THE INVENTION

The primary object of the present invention is to provide a security mechanism of a base, which is substantially a base. The base is provided thereon with a trough and a retaining strip. The retaining strip is disposed above one side of the trough, thereby forming a guard between the base and the computer host. The underside of the retaining strip forms a hole for allowing a power plug to pass through. In this way, the security mechanism of a base can be achieved to increase the safety of the present invention.

Another object of the present invention is to provide a security mechanism of a base, which is substantially a base. One side surface of the base is provided with a plurality of connecting ports for peripheral devices. The plurality of connecting ports for peripheral devices allows the computer host to be connected with other peripheral devices, thereby increasing the performance of the computer host and the practicability of the present invention.

In order to achieve the above objects, the present invention is substantially a base. One side surface of the base is provided with a plurality of connecting ports for peripheral devices. The base is provided thereon with a trough and a retaining strip. The trough is provided therein with a connecting port. The retaining strip is disposed above one side of the trough so as to form a guard, thereby increasing the safety of the base and the performance of the computer host.

Other features and embodiments of the present invention will be further understood with reference to the following description in conjunction with accompanying drawings.

DETAILED DESCRIPTION OF THE INVENTION

Figure 1:
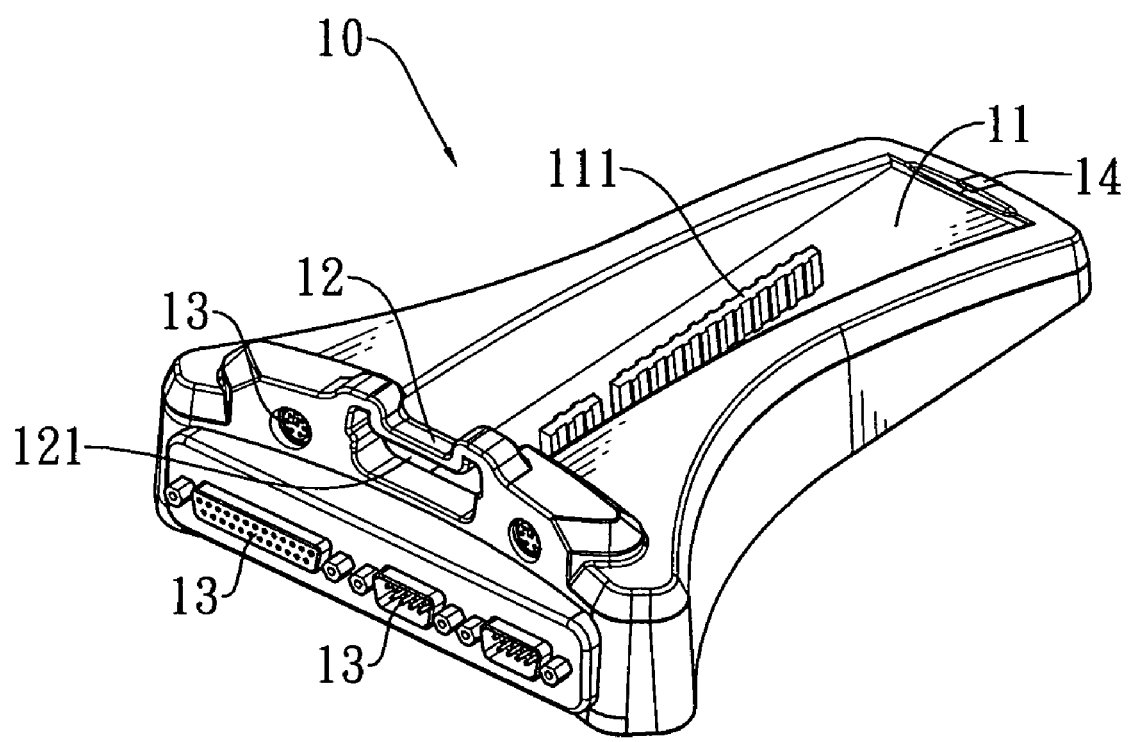
FIG. 1 is a schematic view of the embodiment of the present invention.

Please refer to FIGS. 1 to 4. The present invention is substantially a base 10. One side surface of the base 10 is provided with a plurality of connecting ports 13 for peripheral devices. The plurality of connecting ports 13 for peripheral devices include, for example, a PS/2 port for keyboard, a PS/2 port for mouse, two serial ports, a parallel port and optionally a power port for providing power to the base 10 and a connected computer host 20 (not shown in FIG. 1).

The base 10 is provided thereon with a trough 11 and a retaining strip 12. The trough 11 is provided therein with a connecting port 111 for connecting to a docking port for the computer host 20. The connecting port 111 is any one of a PCI (Peripheral Component Interconnect), ISA (Industry Standard Architecture), PISA (PCI+ISA), AGP (Accelerate Graphic Port), DS (Digital Subminiature), and USB (Universal Serial Bus). The docking port of the computer host 20 is connected to the connecting port 111 of the trough 11 in such a manner that one of them is a "female" port and the other is a corresponding "male" port. In the present embodiment, the connecting port 111 of the trough 11 is a "male" port while the docking port of the computer host 20 is a "female" port. The retaining strip 12 is disposed above one side of the trough 11. The underside of the retaining strips 12 forms a hole 121 for allowing a power plug 21 of the computer host 20 to pass through, thereby forming a guard. Further, the front side of the base 10 is provided with an indicator 14 for shining or glittering synchronously to display the state of the base 10, thereby improving the safety of the base 10.

Figure 2:
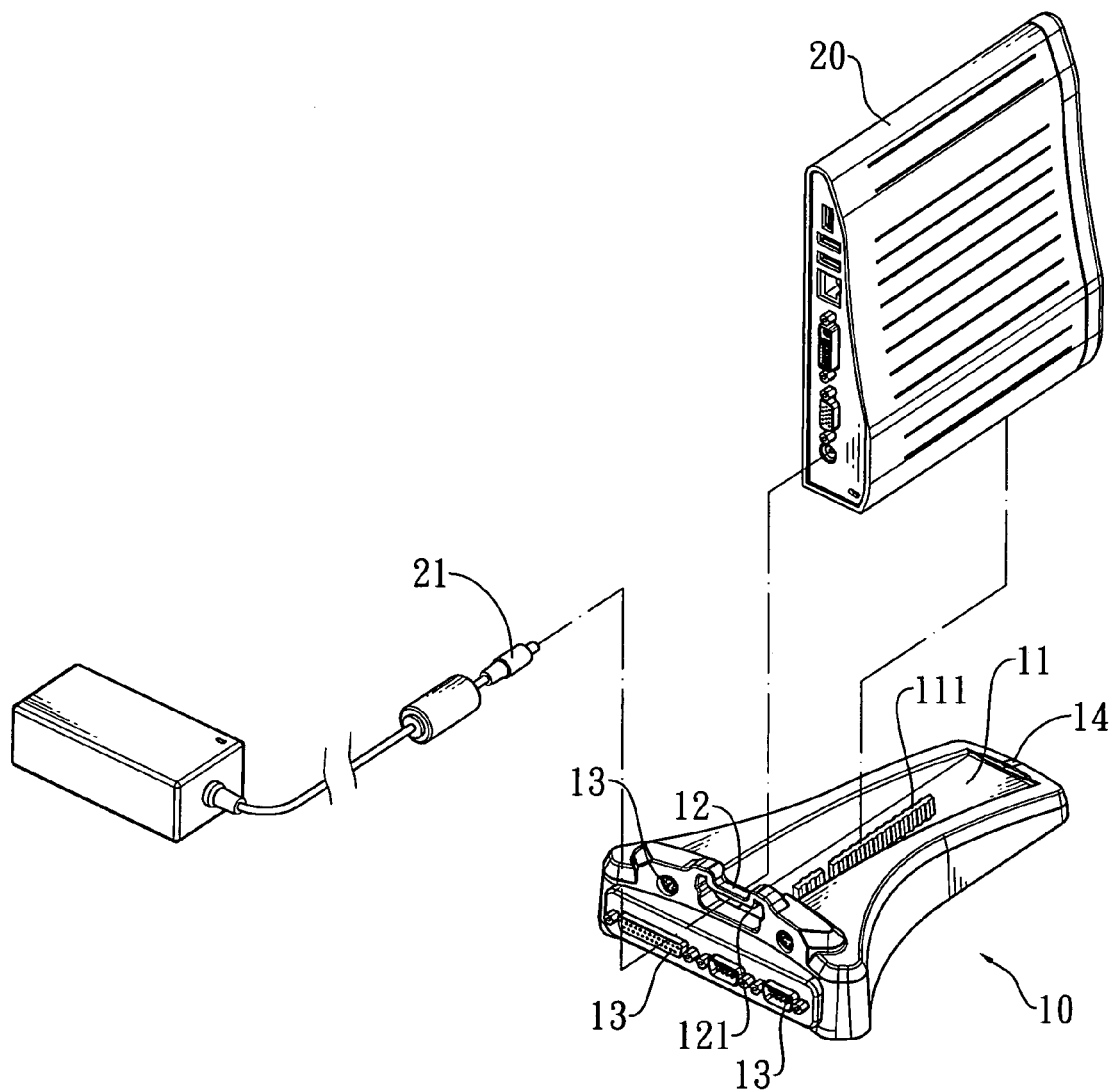
FIG. 2 is an exploded view showing the assembly of the embodiment of the present invention.
Figure 3:
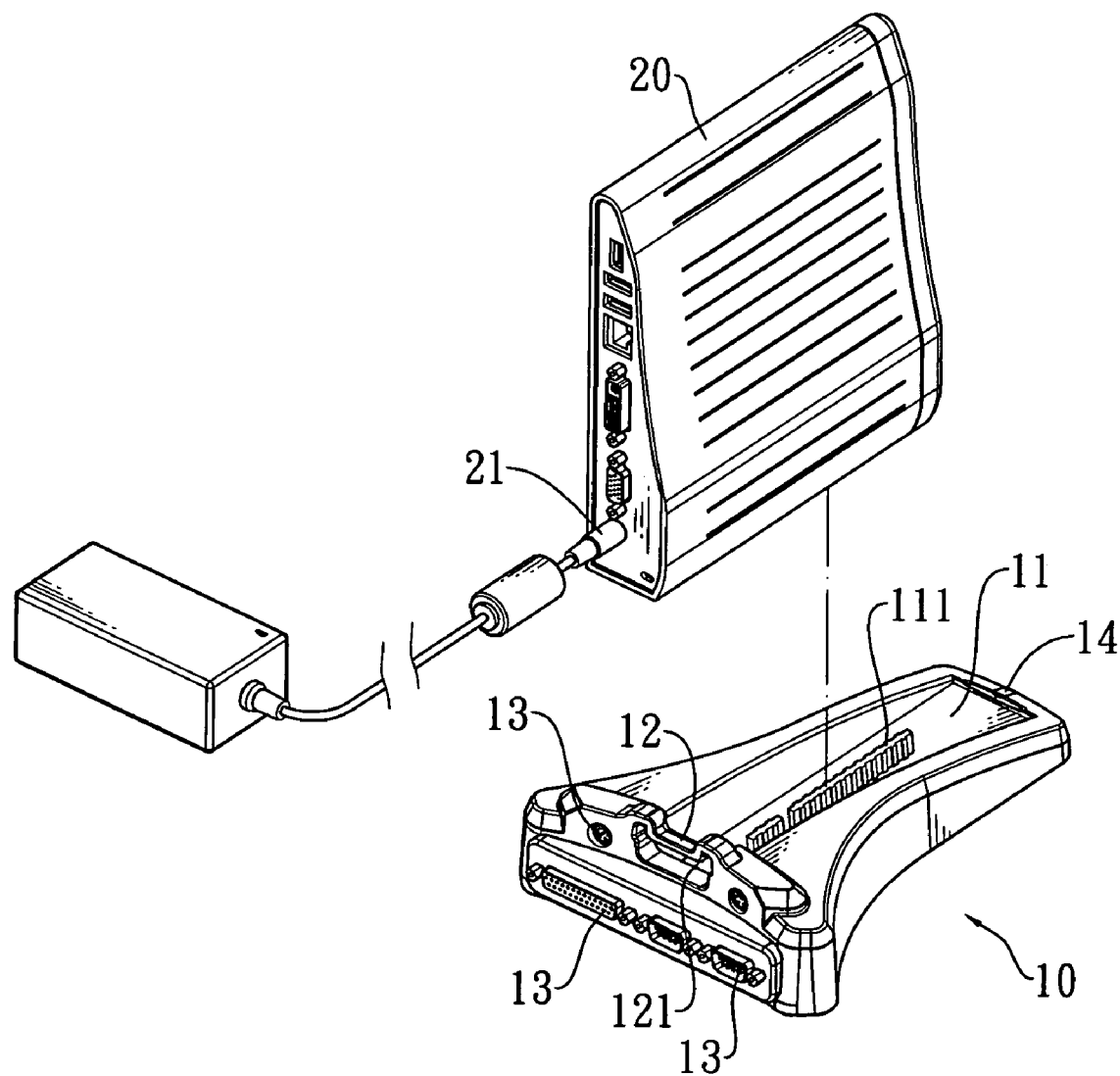
FIG. 3 is a schematic view showing the first operating state of the embodiment of the present invention.
Figure 4:
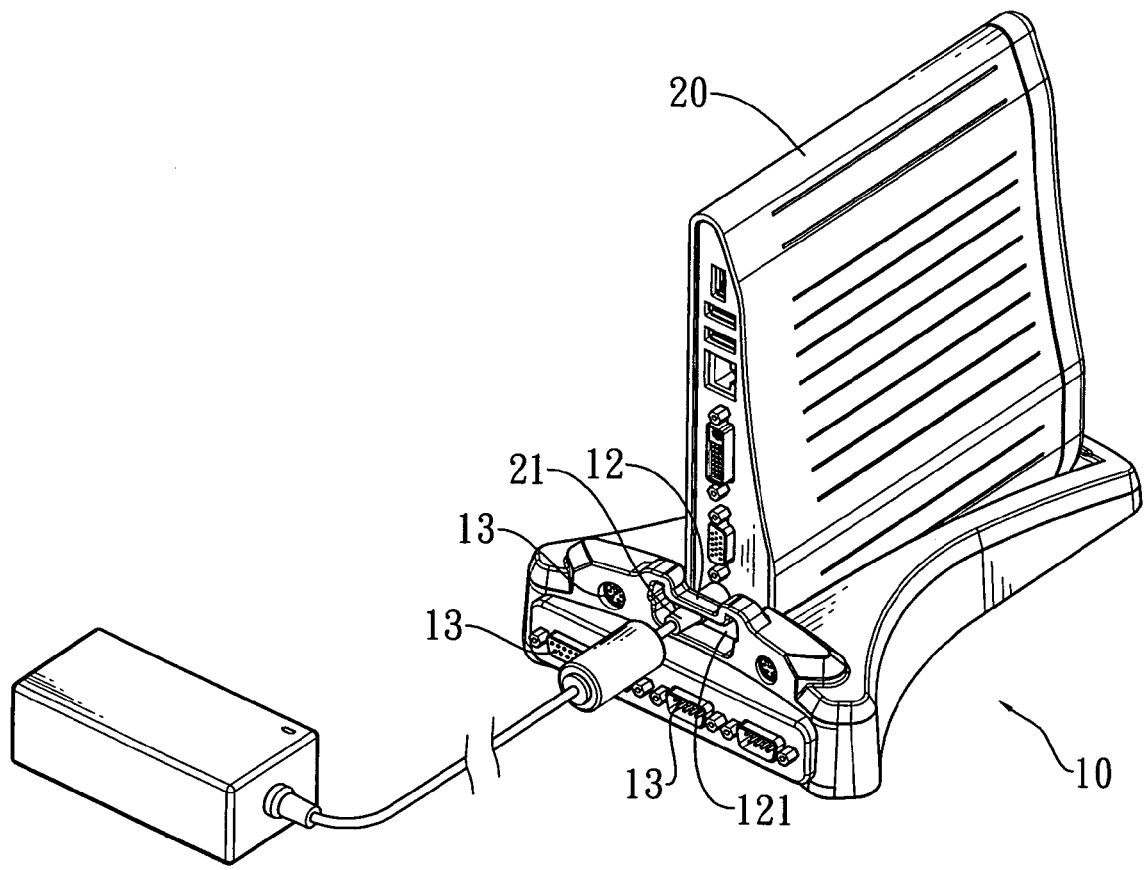
FIG. 4 is a schematic view showing the second operating state of the embodiment of the present invention.

Please refer to FIGS. 2 to 4. When the computer host 20 is connected to the base 10, a docking port (not shown) on the bottom of the computer host 20 should be correspondingly connected to the connecting port 111 in the trough 11. In this way, the computer host 20 can be firmly connected in the trough 11 of the base 10. The retaining strip 12 is disposed above one side of the trough 11. The underside of the retaining strip 12 forms a hole 121 for allowing the power plug 21 to pass through so as to generate an electrical connection with the computer host 20. The indicator 14 on the front side of the base 10 shines or glitters synchronously to display the state of the base 10.

When the computer host 20 is not connected to the base 10, the computer host 20 is powered by inserting the power plug 21 for power supply and turn on to use. When a user intends to connect the computer host 20 to the base 10, if the user does not shut down the computer host 20 properly to pull out the power plug 21 first but connects the computer host 20 to the base 10 directly, the components within the computer host 20 and the connecting ports 13 of the base 10 may suddenly suffer a power failure, resulting in a high-voltage surge, noises, high-low voltage transient state or other harmful influences. As a result, the components within the computer host 20 and the base 10 may suffer damage. Therefore, in the present invention, the retaining strip 12 is disposed above one side of the trough 11 of the base 10. If the user forgets to shut down the computer host 20 first and pull out the power plug 21, the retaining strip 12 can protect the computer host 20 from being connected to the trough 11 of the base 10 directly. This is because the retaining strip 12 of the base 10 will block the power plug 21 from passing through if the power of the computer host 20 is not turned off properly. As a result, it is impossible to connect the computer host 20 to the base 10. The user has to turn off the computer host 20 and pull out the power plug 21 from the computer host 20. After the computer host 20 is connected with the trough 11 of the base 10, the power plug 21 is inserted into the computer host 20 via the hole 121 formed below the retaining strip 12. Then, the user can re-start the computer host 20.

Please refer to FIGS. 1 to 4. The security mechanism of the base according to the present invention is characterized by a base 10 provided thereon with a trough 11 and a retaining strip 12. The retaining strip 12 is disposed above one side of the trough 11, thereby forming a guard between the computer host 20 and the base 10. The underside of the retaining strip 12 forms a hole 121 for allowing the power plug 21 to pass through. One side surface of the base 10 is provided with a plurality of connecting ports 13 for peripheral devices, such as a PS/2 port for keyboard, a PS/2 port for mouse, a serial port, a parallel port, a power port or the like. Via this arrangement, the computer host 20 can be connected to other peripheral devices to improve the performance of the computer host 20. According to the above, the present invention really provides a safety guard and improves the performance of the computer host, so that the safety and practicability thereof are greatly increased.

Although the present invention has been described with reference to the above-mentioned preferred embodiment, this specific embodiment is not used to limit the scope of the present invention. All the equivalent modifications in structure made in view of the disclosure of the specification and drawings will be embraced in the appended claims.

According to the above, the present invention already achieves the desired objects and solves the drawbacks of prior art. Further, the present invention really has novelty and inventive steps. Therefore, the present invention conforms to the requirements for a utility model patent.

What is claimed is:

1. A security mechanism of a base, one side surface of the base being provided with a plurality of connecting ports for peripheral devices, the base being provided thereon with a trough and a retaining strip, the trough being provided therein with a connecting port, the retaining strip being disposed above one side of the trough so as to form a guard, thereby increasing the safety of the base.

2. The security mechanism of a base according to claim 1, wherein the connecting port in the trough is any one of a PCI (Peripheral Component Interconnect), ISA (Industry Standard Architecture), PISA (PCI+ISA), AGP (Accelerate Graphic Port), DS (Digital Subminiature), USB (Universal Serial Bus).

3. The security mechanism of a base according to claim 2, wherein the connecting port of the trough is further connected to a docking port of a computer host.

4. The security mechanism of a base according to claim 3, wherein the docking port of the computer host and the connecting port of the trough are connected with each other in such a manner that one of them is a female port and the other is a corresponding male port.

5. The security mechanism of a base according to claim 1, wherein the underside of the retaining strip forms a hole for allowing a power plug to pass through.

6. The security mechanism of a base according to claim 1, wherein the connecting ports for peripheral devices include any one of a PS/2 port for keyboard, a PS/2 port for mouse, a serial port, a parallel port, and a power port.

7. The security mechanism of a base according to claim 1, wherein the front side of the base is provided with an indicator for displaying the state of the base.

* * * * *